Fig. 1.

B. D. CHAMBERLIN.
APPARATUS FOR THE PRODUCTION OF BLOWN GLASS ARTICLES.
APPLICATION FILED AUG. 24, 1912.

1,124,702.

Patented Jan. 12, 1915.

UNITED STATES PATENT OFFICE.

BENJAMIN DAY CHAMBERLIN, OF CORNING, NEW YORK, ASSIGNOR TO EMPIRE MACHINE COMPANY, OF PORTLAND, MAINE, A CORPORATION OF MAINE.

APPARATUS FOR THE PRODUCTION OF BLOWN-GLASS ARTICLES.

1,124,702.   Specification of Letters Patent.   Patented Jan. 12, 1915.

Application filed August 24, 1912. Serial No. 716,915.

*To all whom it may concern:*

Be it known that I, BENJAMIN D. CHAMBERLIN, a citizen of the United States of America, and a resident of Corning, New York, have invented certain new and useful Improvements in Apparatus for the Production of Blown-Glass Articles, of which the following is a specification.

This invention relates to certain improvements in glass working machines and it has for its object to provide such an organization thereof that a blow-pipe having a suitable gather of glass thereon being inserted in the machine and the operation of the machine being initiated, the machine will thereafter automatically form the gather into a suitable hollow blank and position the same vertically for elongation and in a proper position relative to the mold and will then arrest itself to permit the elongation of the blank, after which, at a period determined by an attendant, the action of the machine is again started and the mold closed upon the blank and the latter properly blown therein, after which the machine returns to normal position and the blow-pipe is released from its operative mounting therein and presented in proper position to permit its ready removal by the attendant.

Inasmuch as the machine here disclosed is a complete machine capable of performing all the necessary operations attendant upon the production of blown glass articles as hereinbefore described, it embodies improvements both in the combination of the several parts by which the various steps are performed, as well as in the construction of the several parts themselves, as will be hereinafter more fully described and claimed.

Referring to the accompanying drawings in which corresponding parts are designated by corresponding marks of reference: Fig. 16 is a detail view showing the gaging mold or cup and its mounting. Fig. 18 is a similar view but showing the parts in the position they assume at the instant of cupping. Figs. 19$^a$, 19$^b$, 19$^c$ and 19$^d$, represent a blank in the successive steps in its formation in the machine herein described.

The machine here described comprises a plurality of units, each capable of independent and separate operation, and certain parts common to all and several units, for the purpose of economy of space and construction. The units are arranged in alinement with each other upon a common base which supports a suitable motor from which motion is imparted by gearing to the main drive shaft, and the blow-pipe rotating shaft, both of which extending lengthwise of the base and above the same, the said shafts being common to the several units.

Inasmuch as the units may be multiplied to suit the conditions of the case and are similar in construction it will only be necessary to describe the construction of a single unit and its connection with the common mechanism.

Arising from the trough-shaped base 1 are vertical webbed standards 2, carrying the main drive shaft 3, and the main blow-pipe rotating shaft 4, the upper end of each standard having a tubular boss 5 on the forward face thereof to form a bearing for the corresponding cam disk 6, from which various movements to be hereinafter described, are imparted, the disk having peripheral teeth gearing with a pinion 65 upon the main drive shaft, by which the said disk will be rotated from time to time in the operation of the machine. Mounted within the tubular boss of the disk is the trunnion 8 of the blow-pipe frame casting 9, the said trunnion having a central bore through which passes the main blow-pipe rotating shaft 4 common to the several units. Also carried by each webbed standard to one side of the head thereof is a blank forming mechanism, necessary motion to which is imparted from the peripheral teeth on the main cam disk 6, while in the base adjacent to the web frame is mounted the mold. The blow-pipe frame, the blank forming and the mold mechanisms of each unit each have motion imparted from the main disk.

Figure 11:
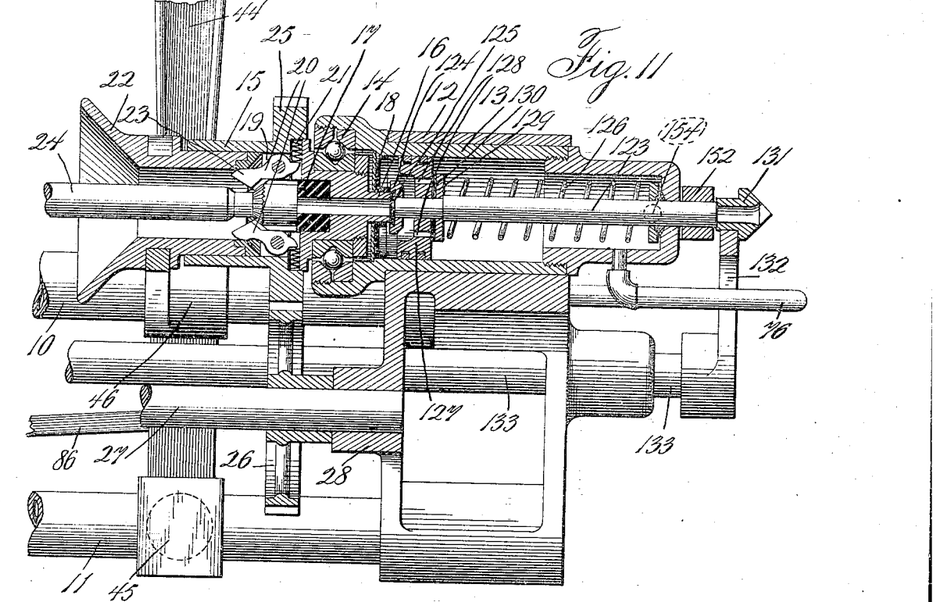
Fig. 11 is a longitudinal section through the air head and blow-pipe chuck in the position they assume after the introduction of a blow-out charge.
Figure 12:
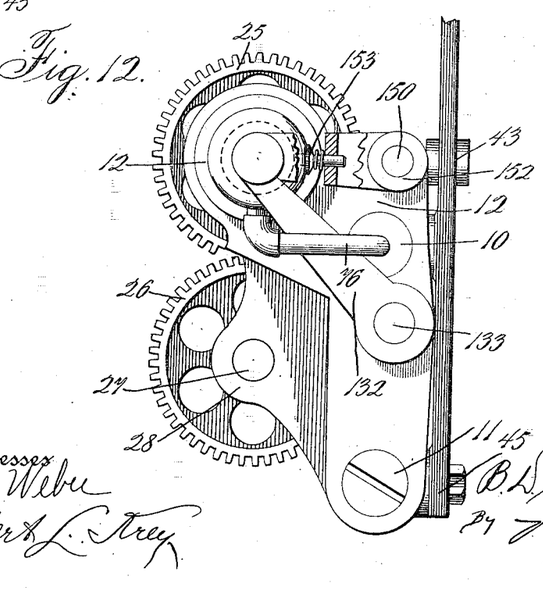
Fig. 12 is an end view thereof.

*The blow-pipe frame.*—The blow-pipe frame comprises a casting 9, having on its rear face the integral trunnion 8, by which it is mounted in the tubular boss 5 of the corresponding standard 2, and a skeleton extension formed by pipes 10 and 11, on each side of the casting, which pipes carry at their upper ends the air head. The air head comprises a casting 12, in which is contained a cylinder 13, having at its lower end a ball bearing 14, by which is carried the shell 15, of a blow-pipe chuck, the rear end of the chuck shell having secured thereto a rearwardly projecting nipple 16, a packing 17 being in the shell in front of said nipple. Around the rear end of the nipple is a cap washer 18, which effects an air tight joint between the nipple and the cylinder. Pivoted within radial slots 19 in the chuck shell are jaws 20, the rear ends of which are normally thrown inwardly by springs 21, whereby the outer ends of such jaws are thrown radially outwardly. Slidably mounted in the outer end of the chuck shell is a collar 22, having a bell mouth, and having its rear end beveled and adapted, when the collar is slid inwardly within the chuck shell, to contact with the noses 23, upon the outer edges of the jaws 20 and thereby throw the front end of the jaws inwardly and against a serrated shoulder formed upon the upper end of the blow-pipe 24 which is to be used in connection with the machine. The terms "upper" and "lower" are here used in respect to the blow-pipe frame and parts carried thereon refer to positions assumed while the blow-pipe frame is in its vertical position.

Figures 6, 7, 8, 9, 10:
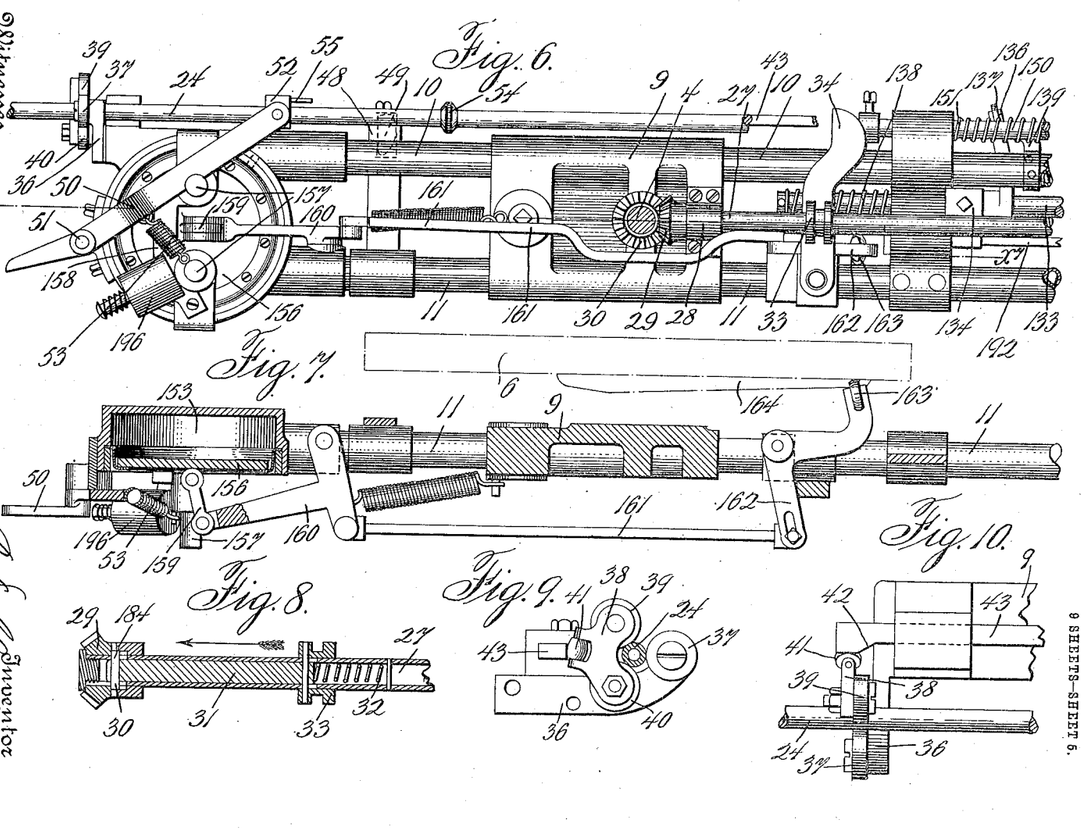
Fig. 6 is a fragmental front elevation of the blow-pipe frame, in its horizontal position with the blow-pipe inserted therein, the lower part thereof being shown.
Fig. 7 is a section on line $x^7$—$x^7$ of Fig. 6 of the molding air pump and its actuating mechanism, in the position immediately preceding the blowing.
Fig. 8 is an enlarged sectional view of the blow-pipe rotating clutch in engaged position.
Fig. 9 is an end view of the blow-pipe releasable guide bearing for the gather end of the blow-pipe.
Fig. 10 is a plan view thereof.

The chuck shell carries a crown gearing 25, which meshes with a pinion 26, on a tubular shaft 27, having it outer end mounted in the air head casting and carried near its inner end in a bearing 28, on the blow-pipe frame casting, the said shaft having journaled thereon a beveled pinion 29, meshing with a corresponding pinion 30, fast upon the main blow-pipe rotating shaft 4, immediately in front of the blow-pipe frame. The pinion 29 upon the tubular shaft has a slotted head, with which a cross head 184, upon the inner end of a rod 31 contained within the tubular shaft 27, is adapted to engage when projected in the direction of the arrow by a spring 32. The rod 31 is keyed in the shaft 27 and is adapted to be retracted therein against the tension of the spring, by a grooved collar 33 keyed to the rod. Thus the blow-pipe will be rotated through the chuck and the driving connection from the main blow-pipe rotating shaft so long as the clutch formed by the pinion 29 and the cross head 184 is in engagement. Pivoted to the blow-pipe frame casting is a lever 34 provided with a finger 35 engaging the groove in the collar 33. As hereinafter described the lever 34 is actuated to disengage the clutch to arrest the rotation of the blow-pipe.

Attached to the lower end of the lower skeleton extension of the blow-pipe frame is a bracket 36, projecting forwardly from the face of the frame and carrying on its forward end an anti-friction roller 37. Pivoted to the forwardly extending portion of the bracket 36, and extending upwardly therefrom is a lever 38, having an anti-friction roller 39, on the upper end thereof, while a third anti-friction roller 40 is mounted at the pivotal point of the lever 38. The rollers form a bearing for the lower end of a blow-pipe when held in the frame, the forwardly projecting bracket serving as a fixed guide in the insertion of the blow-pipe.

The rear face of the lever 38 has a roller 41 thereon, with which a beveled face 42, on a rod 43, slidingly carried by the blow-pipe frame, contacts for the purpose of moving the guide roller 39 toward the fixed roller 37, and thus engaging and rotatably supporting the lower end of the blow-pipe when the same has been inserted between them. The sliding rod 43 has its upper end connected to an intermediate portion of a hand lever 44, pivoted at 45, to the upper skeleton portion of the blow-pipe frame, the lever also carrying a yoke 46, engaging an annular groove 47 upon the chuck shell 15, whereby an upward movement of such lever will not only close the jaws 20 upon the upper end of a blow-pipe inserted in the chuck, but will also cause the movable guide roller 39 to be shifted to engage and position the lower end of the blow-pipe. The blow-pipe frame below its center has also pivoted to its rear face one end of a lever 48, the opposite end of which is pivotally connected to the sliding rod 43, said lever carrying on its rear face a stud 49, adapted in the rotation of the main cam disk to be thrown for the purpose of automatically opening the chuck jaws 20 and the blow-pipe guide formed by the rollers 37, 39 and 40, as will be hereinafter described.

A lever 50 has its one end mounted on a horizontal pivot 51, in the lower end of the lower extension of the blow-pipe frame, and carries in its upper end a yoke 52, the yoke being normally held in alinement with the axis of a blow-pipe inserted in the frame, by a spring 53, the yoke opening sidewise in such manner that when the blow-pipe is inserted in the chuck and in the guide formed by the rollers 38, 39 and 40 of a blow-pipe frame when horizontal, it will also be inserted in the yoke. The lever 50 is however capable of swinging on its pivot 51, under the pressure exerted thereon by a collar 54 on the blow-pipe when the blow-pipe frame is inclined, and the blow-pipe released, as will be hereinafter described. Normally the collar 54 is not in contact with the yoke, but when in contact therewith is prevented from sliding off the yoke by the pins 55 on the latter.

*Blow-pipe frame actuation.*—The blow-pipe frame is mounted to turn about the same axis as is the main cam disk and the following mechanism is employed for causing the rotation of the cam disk to cause oscillation of the blow-pipe frame. A collar 56 is fast upon the forward end of the tubular boss on the web standard 2 and carries a radially projecting arm 57, to which is pivoted one end of a link 58, the opposite end of which is connected with one end of a link 59, the opposite end of which latter link is pivoted by the pin 60 to the rear face of the blow-pipe frame casting eccentric to the center of rotation thereof. The link 58 carries intermediate of its length and on its rear face a roller 61, contained within a cam run 62 on the front face of the main cam disk 6. As a result of this construction it will be seen that as the cam wheel is rotated in the direction of the arrow in Fig. 3 and moved past the fixed pivot on the arm 57 of the toggle lever system formed by the two links 58 and 59, the link 58 will be caused to assume different angular positions around such pivot and will thereby impart motion to the link 59 connected thereto and to the blow-pipe frame, whereby the latter will be swung around its axis of rotation. The cam run 62 is so shaped that when the parts are in normal position the blow-pipe frame is substantially horizontal and that it will during the movement of the cam disk first be swung in the direction reverse to that of the movement of the disk; after a rest will then be reversed in its movement and be swung in the direction of the movement of the disk until vertical and will during further movement of the disk be temporarily held in its vertical position; and will then on further rotation of the disk be given a movement reverse to that of the rotation of the disk and returned to normal position. The functions accomplished by these several movements of the blow-pipe frame will be hereinafter described. For the present it is sufficient to state that the initial movement of the blow-pipe frame in the direction reverse to that of the movement of the wheel raises the lower end (that is to say that end upon which is the gather of glass) of the blow-pipe slightly above the horizontal position, which is the normal position of the blow-pipe frame, and positions the blow-pipe for the marvering and cupping of the blank thereon; that the next movement of the blow-pipe, (which is in the same direction as the rotation of the disk) causes the introduction of blow-out air into the blank and places the blow-pipe in a vertical position with the blank thereon in proper relation to the mold for molding, that the temporary arrest of motion of the blow-pipe frame permits the elongation of the gather, and that the subsequent movement of the blow-pipe frame in the direction reverse to that of the rotation of the disk restores it to its normal position. These movements and the rest at marvering and cupping are all due to the rotation of the cam disk and are functions of the rotation of that wheel, but inasmuch as the period necessary for elongation is variable, dependent upon the character and heat of the glass and of the mass of the gather, means are provided for permitting variation in the rest position of the blow-pipe at elongation. This is a function of the main clutch 63.

*The main clutch.*—The main clutch of each unit comprises a collar 64, fast upon the main drive shaft 3 and provided with a rear toothed end. Journaled on the drive shaft adjacent to the collar and in the rear thereof is a pinion 65, meshing with the peripheral teeth of the main cam disk 6, the hub of the pinion being longitudinally recessed at 66, to receive a bolt 67, normally projected into engagement with the toothed end of a collar 64, by means of a spring 68, whereby the pinion is locked to the drive shaft and thereby serves to drive the cam disk. The bolt has a shoulder 69, on the outer face thereof, adapted to be engaged by a beveled face 70, upon a ring 71, contained in an annular groove in the hub of the pinion, but normally projected forwardly in respect to the rotation of the drive shaft 3 (see arrow, Fig. 21) by means of a spring 72, interposed between a pin 73, in the hub of the pinion, and a shoulder 74 upon the said ring. To permit such projection of the bolt a slot 75 in the ring registers with the shoulder 69 on the bolt at such times. However upon arresting the rotation of the ring, while the pinion 65 is rotating, relative motion will take place between the hub of the pinion and the ring and the coacting beveled faces on the ring and the shoulder 69 of the bolt will retract the latter and disengage the clutch. For the purpose of effecting this arrest of the ring the latter has peripheral teeth 77 thereon, with which a nose 78, on a sleeve 79, mounted upon a bearing 80, adjacent to and parallel with the main shaft 3 is adapted to engage. The sleeve 79 is provided with a crank arm 81, projecting outwardly and connected by a link 82 with one arm of a pivoted bell-crank lever 83, a spring 84, tending to bend the toggle system thus formed, being connected thereto, whereby the nose 78 will be pulled from disengagement with the toothed ring 71, thereby engaging the clutch.

Figure 1:
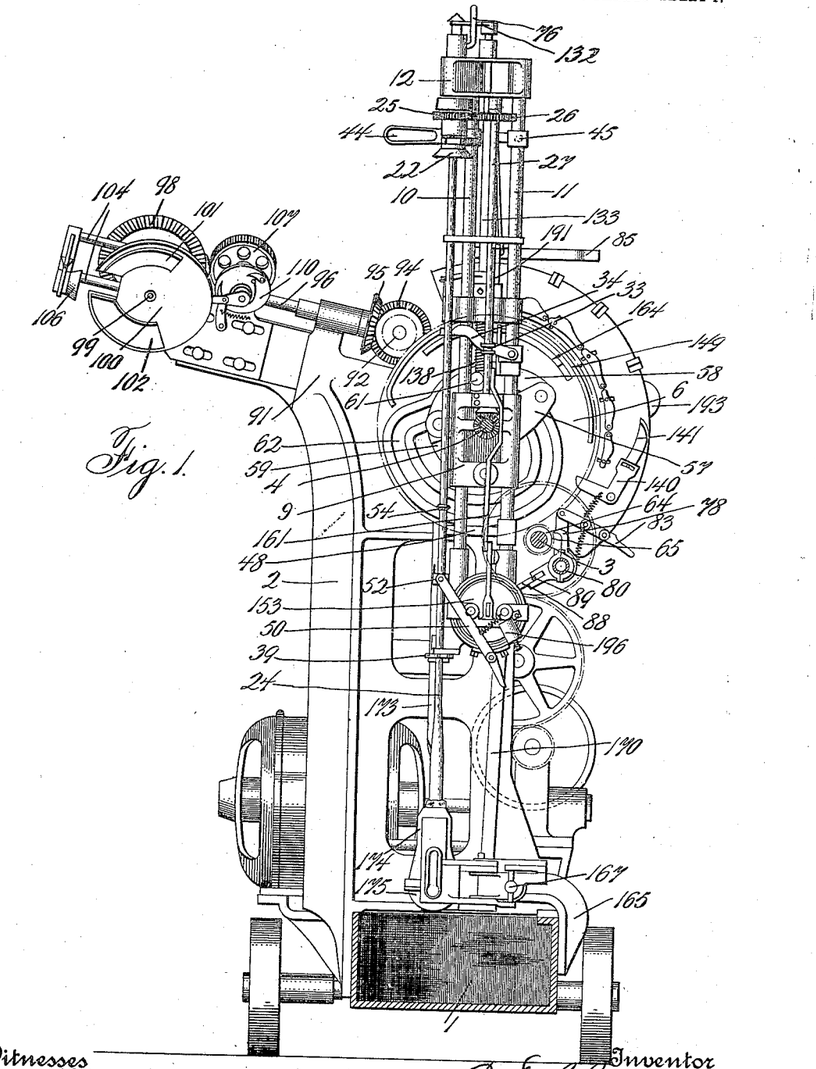
Figure 1 is a front elevation of the machine forming the subject matter of this invention, the parts being shown in the position they occupy during the blowing.
Figure 2:
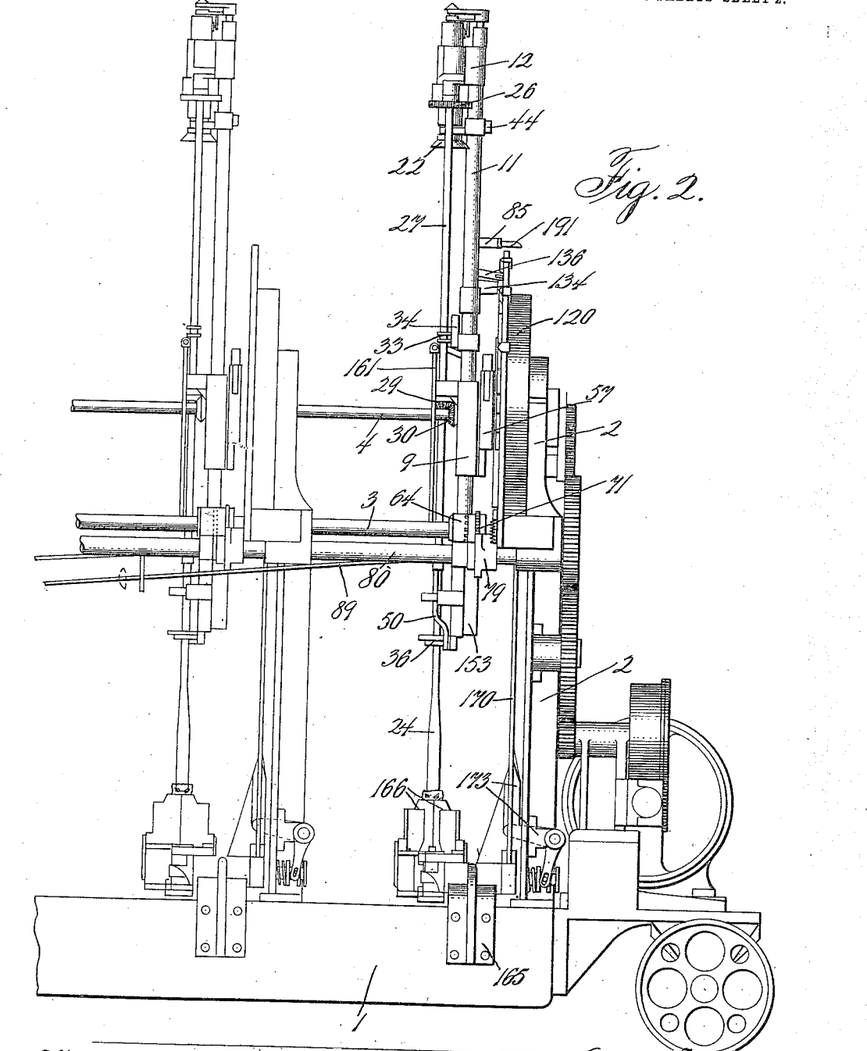
Fig. 2 is a side elevation thereof, one unit and the parts common to the several units being shown in full lines, and another unit being shown diagrammatically.
Figure 3:
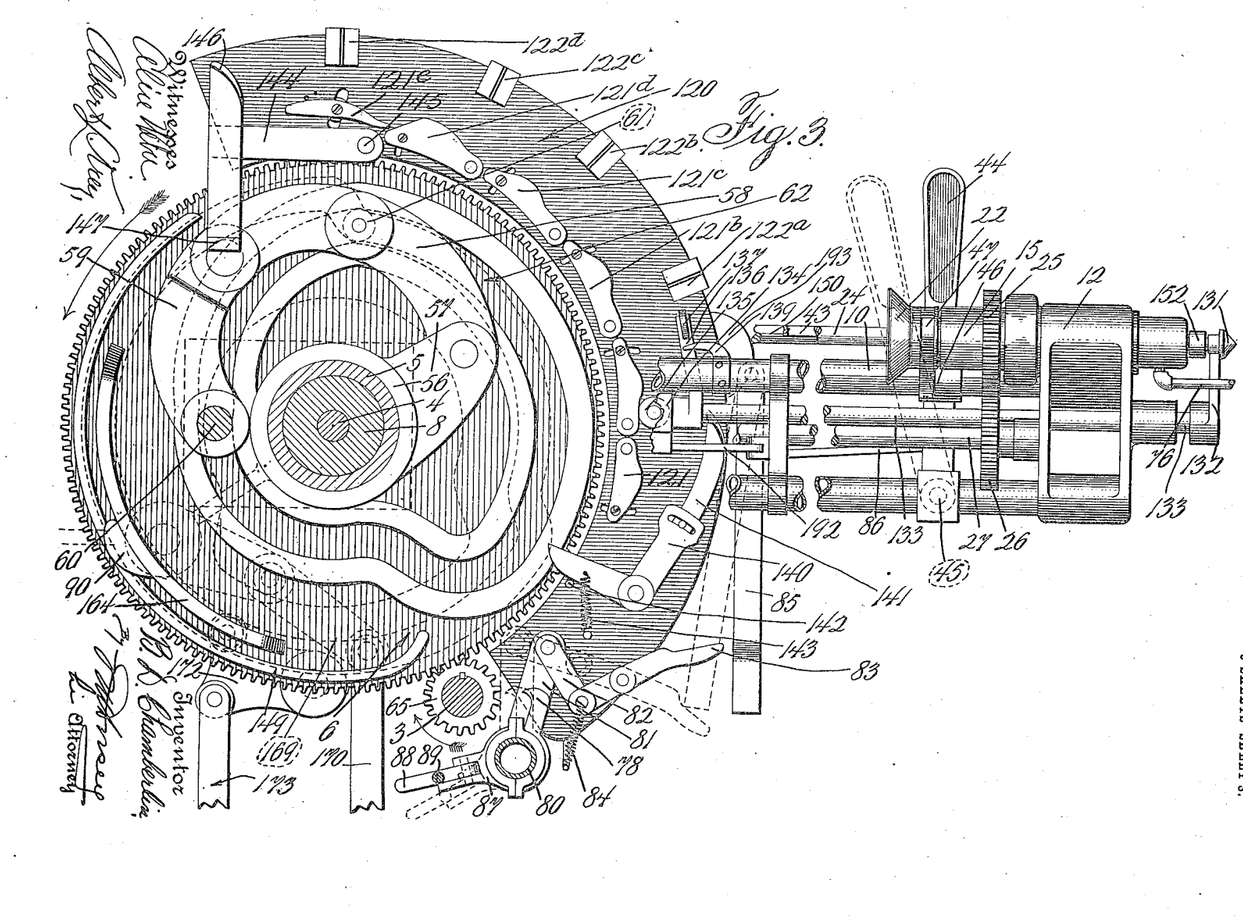
Fig. 3 is a fragmental front elevation of the main cam and its mounting, the blow-pipe frame, actuating links for the latter and certain parts of the air mechanism, the blow-pipe frame being in horizontal position with the blow-pipe held therein.

Pivoted upon the blow-pipe frame pipe 10 is a clutch actuating presser foot 85, connected by a link 86, with the hand lever 44, the presser foot normally and when the blow-pipe frame is horizontal, resting on the projecting end of a bell crank 83, as shown in dotted lines in Fig. 3 and straightening out the toggle system to hold the nose 78 in engagement with the ring 71. Upon moving the hand lever 44 to engage the clutch with the blow-pipe and close the rollers 37, and 39, the presser foot 85 will be drawn from off the end of the bell crank 83, permitting the spring 84 to bend the toggles, thereby releasing the toothed ring 71 and permitting the main clutch to go into engagement, whereupon the cam disk 6 will be rotated to swing the blow-pipe frame for its various movements and to finally position it vertically. The sleeve 79 also carries a downwardly and inwardly projecting bifurcated arm 87, in which is pivoted a finger 88, adapted when the blow-pipe reaches its vertical position to be struck by the side of the blow-pipe frame, thereby again rocking the sleeve 79 to disengage the clutch, whereupon the movement of the blow-pipe frame is arrested. The clutch may then, and after a proper time to permit elongation, be reëngaged by manually shifting the finger 88 upon its pivot in the bifurcated arm 87, by means of a push rod 89, which throws the finger to the rear of the plane of the blow-pipe frame, permitting the spring 86 to again draw the nose 78 out of engagement with the toothed ring 71, whereupon the clutch is again engaged. The cam disk 6 is thus again put in rotation for the purpose of introducing the blowing air and actuating the mold mechanism and for finally restoring the blow-pipe frame to initial position. Upon the run of the blow-pipe frame to this position, a projection 90 upon the main cam disk 6 will contact with the stud 49 upon the lever 48 of the chuck actuating system, to open the blow-pipe engaging jaws, and release the blow-pipe, this movement being attended by a restoration of the presser foot 85 to its initial position in respect to the blow-pipe frame. After this release of the blow-pipe the blow-pipe frame will reach its normal horizontal position and the presser foot will strike the end of the projecting end of the lever 83 and again throw the nose 78 into engagement with the toothed ring 71, to disengage the main clutch, whereby the rotation of the cam disk 6 will be stopped with all parts in their normal position ready for the repetition of the operation.

Part of the cam run 62 which coacts with the roller 61 upon the blow-pipe actuating toggle system upon the reëngagement of the clutch is concentric, so that, during such period and while the blowing and molding operations are performed the blow-pipe frame is stationary. This stationary period of the blow-pipe frame during blowing and molding is purely, however a function of the shape and the length of the cam run and should not be confused with the elongation period, which is due to the disengagement of the main clutch.

*Blank shaping device.*—For the purpose of shaping such part of the gather as is to be used in making the finished article, and for gaging the quantity of glass contained therein a marvering and cupping mechanism is provided. By this mechanism a batch of glass which has been affixed to, or gathered on, the blow-pipe, is roughly marvered to generally shape it, and such marvered blank is gaged as to size and shape and subsequently remarvered to produce a homogeneous blank preliminary to the blowing operation and control the distribution of glass in the finished article. One of the features of this part of the invention is the gaging of a mass of glass by momentary contact or inclusion in a suitable gage mold. It is essential to the proper performance of this operation that the contact between the gage mold and the glass be limited in duration, as otherwise the gage mold will cause local cooling of the glass if chilled and if hot will adhere thereto. For these purposes the upper end of the web standard 2 carries on its right hand side a projecting arm 91, on which the blank shaping device is adjustably mounted to be shifted radially in respect to the pivotal point of the blow-pipe frame, such arm being in the rear of the corresponding blow-pipe frame, the axis of the arm being at an angle above the horizontal. In the head of the web standard 2 is the stud 92, having journaled thereon a pinion 93, meshing with the peripheral teeth of the main cam disk 6, and having a beveled gear 94 fast thereto and meshing with the corresponding gear 95, upon the inner end of a telescopic jack shaft 96, carried in the upper part of the arm 91. The outer end of the telescopic shaft carries a beveled pinion 97, meshing with a beveled gear 98, on the rear end of a shaft 99 journaled in the outer end of the arm 91. The shaft 99 is transverse to the arm 91 and inclining downwardly and forwardly, and carries on its forward end in front of the arm 91 a rotary marverer disk 100, having two crown sectors 101 and 102, which are thicker at their rear than at their forward ends, the elevation of the first sector 102 being slightly greater above the plane of the marverer disk on its outside than that of the second sector and the inner periphery of the second sector being of less radius than that of the first sector, and thus nearer the axis of rotation of the disk. Each sector is also beveled having its outer edge thicker than its inner, the sectors being varied in proportion, and contour at their various parts to suit the glass worked and the distribution of glass which they are to accomplish. The marverer disk is thus rotated during the whole period of rotation of the main cam disk, the ratio of the gearing between them being such that the marverer disk is rotated twice to each rotation of the cam disk.

Figure 17:
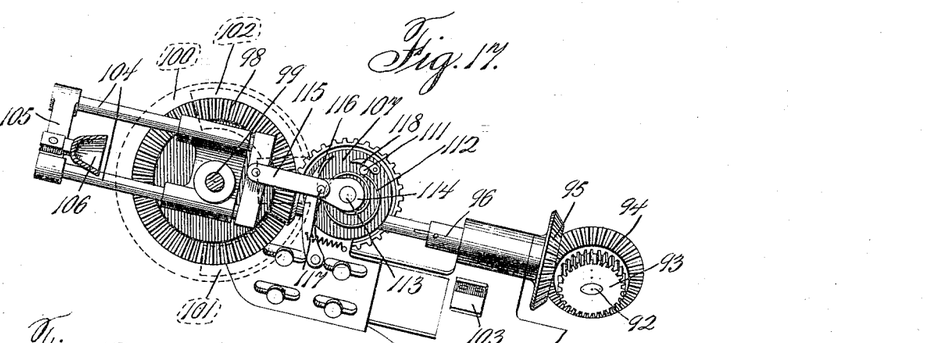
Fig. 17 is a front elevation of the blank shaping mechanism, the marverer disk being shown dotted, and all parts being in normal position, the parts being shown as projected on a plane parallel to the plane of rotation of the marverer disk.
Figure 20:
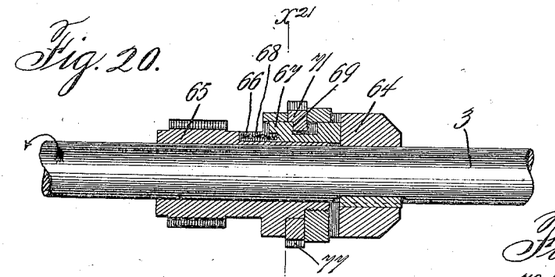
Fig. 20 is a longitudinal section through the main clutch.

In the operation of the machine the initial rotation of the main cam disk lifts the gather end of the blow-pipe and positions the blow-pipe parallel to the axial line of the blank shaping and forming mechanism, the blow-pipe projecting past the axis of the marverer disk, and the blow-pipe frame is arrested in this raised position by a concentric portion of the cam run 62 in the main cam disk and by a stop 103, upon the forward face of the arm 91. When the blow-pipe is so positioned the marverer disk is in such position, as shown in Fig. 17, that further rotation thereof will bring the thinner entering edge of the marverer sector 102 past the gather on the blow-pipe and the continuing rotation of the marvering disk causes the face of the sector 102 to pass into contact with the gather on the blow-pipe, which is in rotation due to the mechanism before described, thereby marvering the gather, and due to the shape of such face, working the glass rearwardly on the blow-pipe.

A sliding frame, comprising rods 104, is mounted in the end of the arm 91 to move axially and parallel with the axis of the blow-pipe when in its raised position, the rods carrying on their outer ends a head 105, to the forwardly extending end of which is secured a gage mold or cup 106, in the axial line of the blow-pipe when raised, and normally beyond the path of movement of the gather thereon. The cup has an inwardly facing smooth internal cavity of proper size and shape, dependent upon the blank which is to be formed.

Figure 13:
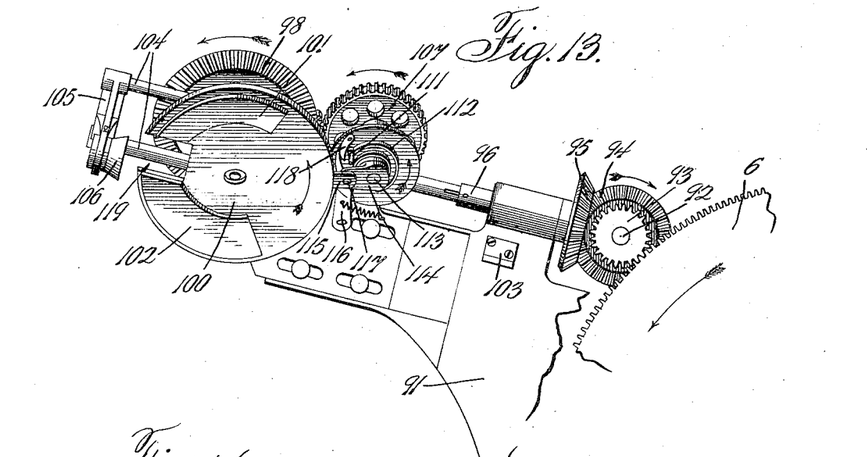
Fig. 13 is a front elevation of the blank shaping mechanism, the parts being shown in the position they occupy immediately before cupping.
Figure 14:
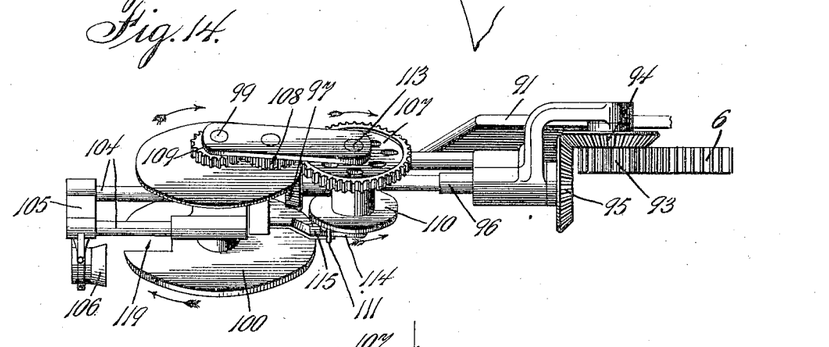
Fig. 14 is a plan view thereof.
Figure 15:
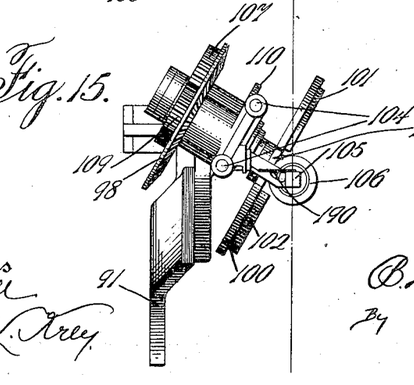
Fig. 15 is an end elevation thereof.
Figures 16, 18, 19A, 19B, 19C, 19D:
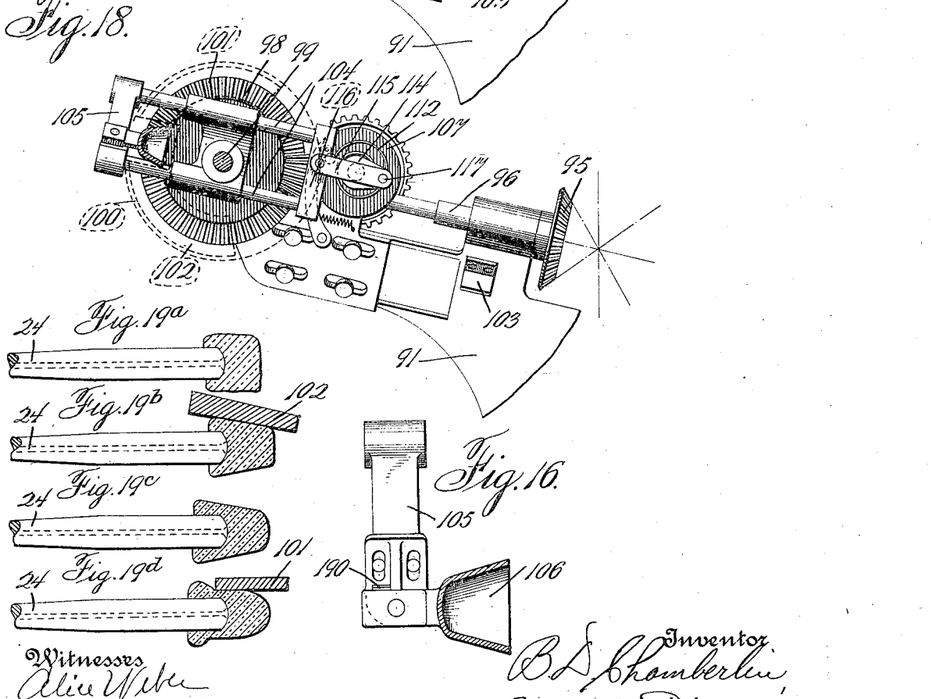

Mounted at an intermediate point of the arm 91 is a shaft 113 having fast on the rear end thereof a gear wheel 107 driven through an idler 108, from a pinion 109, fast on the rear of the beveled gear 98 of the marverer disk, the said shaft 113 having fast thereon a disk 110, which has projecting from the forward face thereof a stud 111, to which one end of a volute spring 112, is secured, the opposite end of the spring being attached to a crank 114 sleeved on the front end of the shaft 113, which arm is connected by a link 115 with the sliding frame. Normally the arm 114 and link 115 are held in alinement parallel with the rods 104 by means of a dog 116, pivoted to the front of the arm 91, and engaging the pivot-pin 117 connecting the arm and link, but such dog is adapted to be released from the pivotal pin by a striker lug 118 upon the said disk contacting with a projecting nose on the dog 116. The arrangement of these parts is such that the gear 107 makes a complete revolution for each two revolutions of the marvering disk, or one revolution for each revolution of the main cam disk, and that at the same time that a notch 119, in the periphery of the marvering disk between the rear end of the first marvering sector 101 and the front end of the second sector 102, comes opposite the gather on the lifted blow-pipe, the striking lug 118 will release the dog 116 (see Fig. 13) from the pivot pin 117 and permit the spring 112, which is at that time under tension, to rapidly rotate the arm 114 through almost a complete revolution, thus causing a sliding movement of the cupping frame formed by the rods 104, whereby the cup or gage mold will be projected upon the end of the gather and be instantly retracted therefrom. This rotary movement of the arm 114 will be arrested before the complete revolution is accomplished by the arm coming in contact with the outer end of the post 111 to which the spring is attached, and by the time such post has, by the rotation of the disk 110, been moved sufficiently far to permit the restoration of the arm to its initial position, the striking lug 118 will have moved past the nose of the dog, permitting the latter to again be positioned to engage the pivot pin 117, thereby arresting the further movement of the latter. The disk 110, continuing to revolve, will again put the spring under tension for a repetition of this action when another gather has been positioned. In this mechanism the first cam sector 102 of the marverer is so shaped that after a mass of glass on the blow-pipe (which may have the shape as shown in Fig. 19$^a$) has been in contact therewith it will be given the shape of a truncated cone (see Fig. 19$^b$) and the surplus of the gather will be worked back to a greater or less extent upon the blow-pipe and is in this shape when the gage mold 106 is projected thereon. Inasmuch as the cavity of this mold has a definite capacity and as the gage mold in every operation is moved inwardly a uniform distance and to within a fixed distance of the end of the blow-pipe, it follows that any surplus glass over the quantity predetermined by the capacity of the gage mold will be forced back upon the blow-pipe (see Fig. 19$^c$). As that part of the gather which extends beyond the end of the blow-pipe will be distributed to form the finished article, it will be seen that each blank after the gage mold has come in contact therewith, consists of a uniform quantity of material to be utilized in the subsequent manufacture of the finished article. After the momentary shaping by the gage mold and the retraction thereof, the continued rotation of the marverer disk brings the second sector 101 thereon into contact with the blank, whereby that part of the latter which is to form the finished article is slightly elongated (see Fig. 19$^d$) and whereby any imperfections left by the gage mold are eliminated. For the purpose of preventing injury to the machine, if for any reason the gage mold should not be retracted from in contact with the gather upon the end of the blow-pipe, the cup is pivotally mounted upon the head 105 and is normally held in position by flat springs 190, so that it may then have a limited angular movement around its pivot moving at such times with the blow-pipe and with the marverer disk until it escapes therefrom, to prevent breakage.

*Air mechanism.*—The mechanism here shown for this purpose has for its object to create in the blank air pressures before elongation, at elongation and during molding. Prior to the elongation it delivers to the blank one or more definitely predetermined volumes of blow-out air under definite pressures and holds in the blank for a definite time the pressure or pressures so created therein and this admission of air may be repeated one or more times prior to the elongation. The air for molding the blank is independent of and distinct in its source from the air admitted during the blow-out and elongation and the air for the last named purpose is controlled by mechanism in the connection between the source of molding air and the blow-pipe.

Mounted on the head of each web standard 2 and in the same plane as the main cam disk 6, is a stationary cam plate 120, which, as shown, is a sector concentric with the bearing formed by the tubular boss 5, and which carries a series of radially adjustable cams 121, 121$^a$, 121$^b$, etc., and a series of crown trip projections 122$^a$, 122$^b$, etc., the rises of the series of cams being radial in respect to the axis of oscillation of the blow-pipe frame while the rises of the projections are at right angles thereto.

Passing through the head of the cylinder 13 is the piston rod 123, the inner end of which is reduced in diameter and carries an enlarged head 124, having a packing thereon 125, which is normally seated against the rear end of the nipple 16 of the chuck shell by a spiral spring 126. Slidably mounted upon the reduced portion of the piston rod 123 is the piston head 127, having ports 128, therethrough, while fixedly mounted upon the piston rod upon the outer side of the piston head is a washer 129, having a suitable packing 130 on its inner face, and adapted when in contact with the piston head 127 to seal the ports 128 therein. The piston rod has upon its outer end and upon the outside of the cylinder, a head 131, with which a laterally extending finger 132 on the outer end of a cocker rod 133 slidably mounted in the blow-head casting and in bearings on the body of the blow-pipe frame, is adapted to engage. The inner end of the cocker rod is provided with a foot block 134, carrying a roller 135, adapted to contact with and be lifted by the cams 121, etc., and has also attached thereto a laterally extending arm 136, having on the end thereof a roller 137, adapted to contact with the projections 122$^a$, etc., on the fixed cam plate, whereby the rod will be given an angular motion. The rod 133 has thus two motions, in its bearings, the one longitudinal, which, when the finger 132 thereon is in engagement with the head 131 on the piston rod, retracts the latter, and the other an angular or rotary movement, which disengages such finger from the head on the piston rod and permits the spring 126 to project the latter inwardly. The sliding rod 133 is itself normally projected inwardly by a spring 138 and given such angular position as will cause its finger 132 to normally engage the head 131 on the piston by a spring 139, fast to the blow-pipe frame and bearing on the arm 136. The head 131 of the piston is coned at its upper end.

Pivoted in front of the fixed cam plate 120 near the lower end thereof is a bell crank lever 140, having an adjustable finger 141, with a bevel nose upon its upper arm, the other arm thereof being substantially horizontal and being normally held in contact with a stop 142, by means of a spring 143. When the blow-pipe frame is in position to effect the marvering the roller 137 upon the slide rod 133 is opposite the beveled nose of the adjustable finger 141, and upon the completion of the shaping of the blank by the blank forming mechanism the substantially horizontal arm of the crank lever 140 will be struck by the crown stud 90 upon the cam wheel to throw its upper end outwardly and to bring its beveled finger behind the roller 137 and thus cause an angular movement of the cocker rod 133.

A three arm tappet lever 144, is pivoted at 145, by its horizontal arm to the upper end of the fixed cam plate 120. A beveled nose 146 is formed upon the upper end of its rising arm, is bent forwardly to form a toe 147, a heel 148 upon such depending arm bearing upon the periphery of a cam 149 upon the face of the main cam disk 6 (see Fig. 4) by which the tappet will be lifted, this occurring during the time the blow-pipe is in vertical position.

Guided in bearings in the air head casting and in the blow-pipe frame is a push rod 150, normally projected inwardly by a spring 151, the upper end of the rod carrying a head 152, which encircles the piston rod 123 below the head 131 thereof and also carrying a sliding valve 153, spring pressed against the cylinder 13, and adapted on the outward movement of the rod to close an aperture 154 in the wall of the cylinder.

It will be noted that the lower cam 121 is reversed in its facing in respect to the other cams of the same series.

Mounted in the lower end of the blow-pipe frame is a diaphragm pump, consisting essentially of a cylinder 155, having a diaphragm piston 156, guided by stems 157, in a bracket 158, extending across the open end of the cylinder. A link 159, has its one end connected to the piston 156 and its other end connected to one end of a three arm lever 160, which lever has another of its arms pivoted to the blow-pipe frame and has its third arm extending forwardly and connected by a link 161, with the slotted forwardly extending arm of a bell crank lever 162, also pivoted in the blow-pipe frame and having its other arm extending upwardly and rearwardly to the rear of the frame, where it carries a roller 163, which is adapted to be moved forwardly upon the rotation of the main cam disk by a crown cam 164 thereon, (see Figs. 6 and 7) which is adjustable to and from the main disk. By the adjustment of the cam 164 to and from the disk and the adjustment of the link 161 in the slot of the bell crank 162, the characteristics of the charge of air delivered by the diaphragm pump may be varied. The interior of the pump cylinder 155 is connected through the pipe 10 and through the pipe 76 with the head of the cylinder 13 in the air head.

With the air mechanism arranged as before described and the parts in their normal position their operation is as follows:—The blow-pipe frame being put in movement and the gather end of the blow-pipe being lifted, the lower cam 121 shoves the rod 133 outwardly and as the finger 132 thereon is beneath the head 131 on the piston rod 123, the latter partakes of this movement. This retraction of the piston unseats the enlarged head 124 thereon from the nipple 16 on the blow-pipe chuck, and also causes such relative movement of the piston head 127 on the piston rod as will separate the washer 129 from the head 127 and uncover the ports 128. After the cupping and marvering has been effected, at the termination of the upward movement of the gather, the crown stud 90 on the main cam wheel will contact with the substantially horizontal arm of the bell crank 140 and throw the finger 141 on the other arm thereof outwardly, behind the roller 137, thereby partially rotating the cocker rod 133, and disengaging the finger 132 thereon from the head 131 of the piston rod, permitting the spring 126 to project the latter inwardly. This projection of the piston by the spring 126 first closes the ports 128 and then forces a definite quantity of air into the formed blank on the blow-pipe to form a central cavity therein and to clear the bore of the blow-pipe from any glass that may have been forced therein by the action of the gage mold. The projection of the piston also seals the end of the blow-pipe, temporarily trapping the air therein. The cocker rod 133 is subsequently returned to normal position by its spring 138 when the movement of the blow-pipe frame moves it from over the cam 121 and in so doing the finger 132 contacts with the beveled top of the head 133 on the piston rod and slips past the same to engage therewith. This releasing action of the finger 141, (as will be noted) is due to the rotation of the main cam disk and can be timed to occur while the blow-pipe frame is stationary with the gather raised.

Upon the movement after marvering, of the blow-pipe frame, toward vertical position, the cocker rod 133 and piston 123 will be forced outwardly by the successive cams 121ᵃ, etc., and the piston will be released from the rod by the successive trips 122ᵃ, etc., thereby forcing a succession of air charges into the blank. The number of the several cams 121ᵃ, etc., and corresponding trip projections 122ᵃ, etc., may be varied at will and it will also be found advisable to make the several cams adjustable on the cam plate, whereby the quantity of air forced into the blank at each stroke of the piston may be varied. As the blow-pipe frame swings to vertical position, the cocker rod 133 is finally lifted by the cam 121ᵉ and the end of the blow-pipe rotating clutch lever 34 moves over the toe 147 of the three arm lever 144, and the final rotation of the main cam disk just before it is stopped by the blow-pipe reaching vertical position, partially lifts such lever and thus disengages the blow-pipe rotating clutch, whereby the rotation of the blow-pipe will be arrested. This is of value during elongation as it prevents the blank being twisted and strained by any unequal distribution of glass that might exist therein. Upon the main cam wheel being again put in rotation, the lever 144 is further raised, whereby it will drop its contact with the blow-pipe rotating clutch lever 34 (thus again putting the blow-pipe in rotation) and whereby the upper beveled face 146 on the lever 144 is brought into contact with the roller 135 on the cocker rod 133 to rotate such rod. This effects another release of the piston 123, whereby air will be forced within the mold. The continued rotation of the disk will further raise the three arm lever, bringing the toe thereof into contact with the push rod 150 to lift the latter, thus closing the aperture 154 in the cylinder 13 and slightly shifting the piston 123 to unseat the enlarged head 124 thereon from the nipple 16, and to uncover the ports 128 in the piston head 127. About the same time the cam 164 on the main cam disk moves behind the roller 163 on the pump actuator bell crank 162, and through the link 159 presses in the diaphragm 156, thereby delivering air to the cylinder 13, which air passes through the uncovered ports 128 and through the nipple 13 to the blow-pipe and blank thereon to blow the latter when in the mold. The cam 164 is so shaped that the diaphragm of the pump will be so actuated with such movement as to produce the proper graduation in the amount of air delivered to the blank, this gradually increasing.

It will be noted that the cylinder 13 is in communication with the outer atmosphere through the aperture 154 during the periods in which the admission of air into the blow-pipe is due to the action of the piston pump, formed by the cylinder 13 and piston therein, and that the pusher rod 150 forming the means for closing such aperture simultaneously unseats the enlarged head 124 from the nipple 16 and opens the ports 128 to effect an uninterrupted communication between the diaphragm pump and the blow-pipe.

It should be further noted that when the parts are in their normal position the cocker rod 133 is retracted slightly, whereby the end of the nipple 13 and the ports 128 will be opened, so that when the blow-pipe is placed in the blow-pipe frame, with its end in the chuck, the interior of such blow-pipe will be in communication with the external air through the aperture 154, thus precluding any premature compression of air within the blow-pipe during the closing of the chuck thereon.

It will be further noted that prior to the introduction of each air charge the interior of the blow-pipe is placed in communication with the external air through the nipple and ports, which are opened on the rearward movement of the piston rod 123 preparatory to the forcing in of the next charge, and through the aperture 154.

Figures 4, 5, 25:
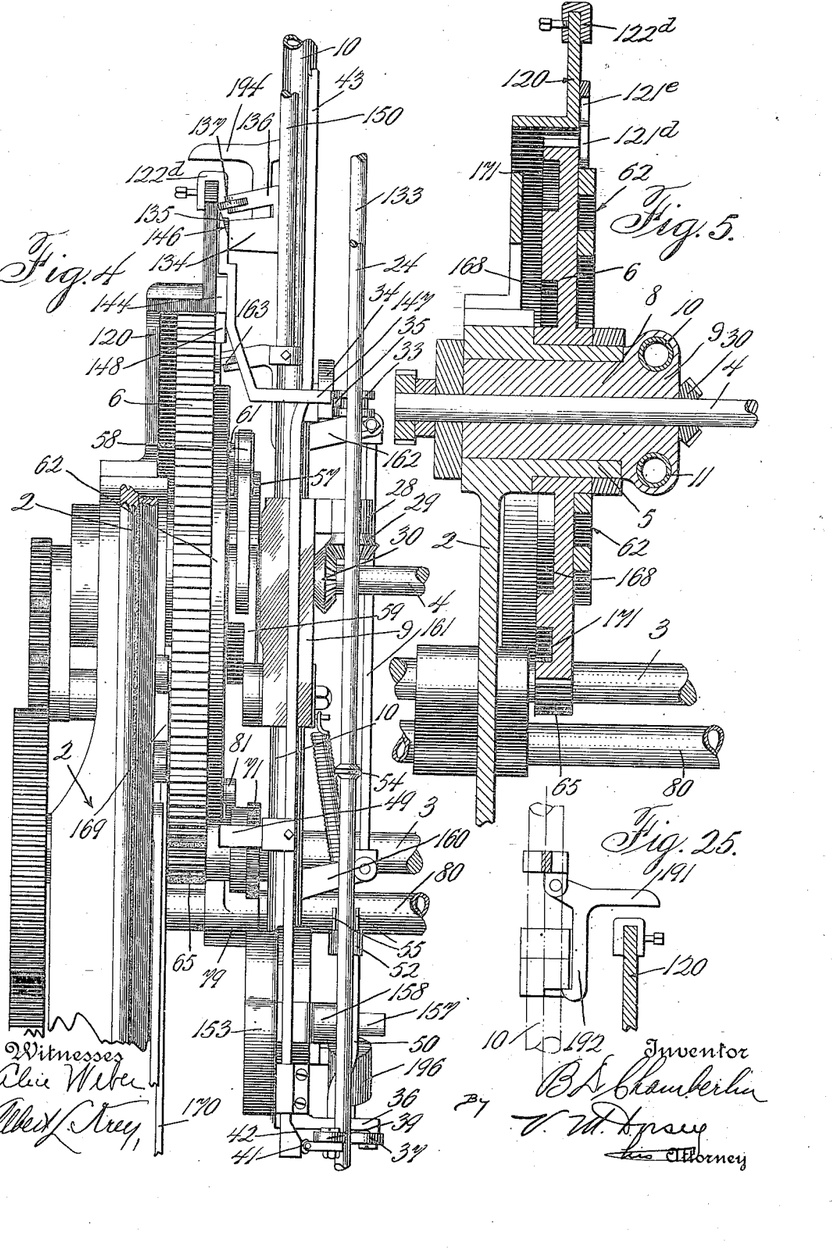
Fig. 4 is a fragmental elevation of the main cam and its mounting, the lower part of the blow-pipe frame and certain parts of the air mechanism, the blow-pipe frame being shown in the position it assumes during the molding period, together with the blow-pipe inserted therein.
Fig. 5 is a central vertical section taken at right angles to Fig. 3.
Fig. 25 is a detail showing the latch for the cocking rod.

In order to hold the cocker rod 133 outward during the return of the blow-pipe frame from vertical to horizontal position, and to thus avoid at such time actuation thereof by the series of cams 121ᵃ, etc., and the actuation of the pump piston 123, there is pivoted on the blow-pipe frame a latch 191, having a finger 192 on the lower end thereof adapted to catch the lower face of the block 134 on the cocker rod when the latter has been lifted by the last cam 121ᵉ when the blow-pipe is vertical, the lift of the cam being greater than the others of that series. Thus the cocker rod when the beveled face 146 on the tappet shifts it to cause its finger 132 to release the pump piston 123 is held raised and retained in this position until a peripheral cam 193 on the fixed sector 120 lifts an arm 194 on the latch 191 as the blow-pipe frame is approaching its horizontal position, this releasing the cocker rod.

*Mold mechanism.*—Mounted on a bracket 165 adjacent to the base of the web standard is the mold mechanism comprising two mold halves 166 pivoted for opening and closing movement upon a horizontal shaft 167, which shaft is rotated for dipping the mold in the water in the trough shaped base 1 by a cam track 168 on the rear of the main cam disk and by an operating lever 169 and a link 170, connecting the latter with the shaft 167. The mold halves are opened by a second cam track 171, also on the rear of the main disk and by an operating lever 172, connections 173 being provided to accomplish these movements, the shape of the cams being such that the molds are normally open and immersed in the water. The adjustments are such that by the time the blow-pipe becomes vertical the molds are erect and open; that the rotation of the main cam disk after elongation closes the mold upon the blank and after a proper time to permit the molding, opens the mold to permit the blown article to be removed from the mold cavity by the return of the blow-pipe frame to normal position. The molds are returning to their dipped position during the return of the blow-pipe frame.

*The molds.*—Molds heretofore employed have generally consisted of a separable iron body, the inside of which has a layer of carbon formed thereon by the burning off of a hydro-carbon fluid. These molds require to be wetted between each blow and difficulty has been experienced both in maintaining the carbon deposit and from the molds due to their high conductivity, causing the rapid cooling of the article and the consequent formation of stresses therein. These defects are avoided by making the mold of a body of carbon, preferably of some agglutinated form thereof, and as such material is not of such inherent strength as to withstand the stresses to which it is subjected, it is inclosed in a separate cage of metal, leaving between the carbon and cage a chamber through which water may be circulated to cool the exterior of the carbon mold, its interior being also cooled in the dipping.

Figures 21, 22, 23, 24:
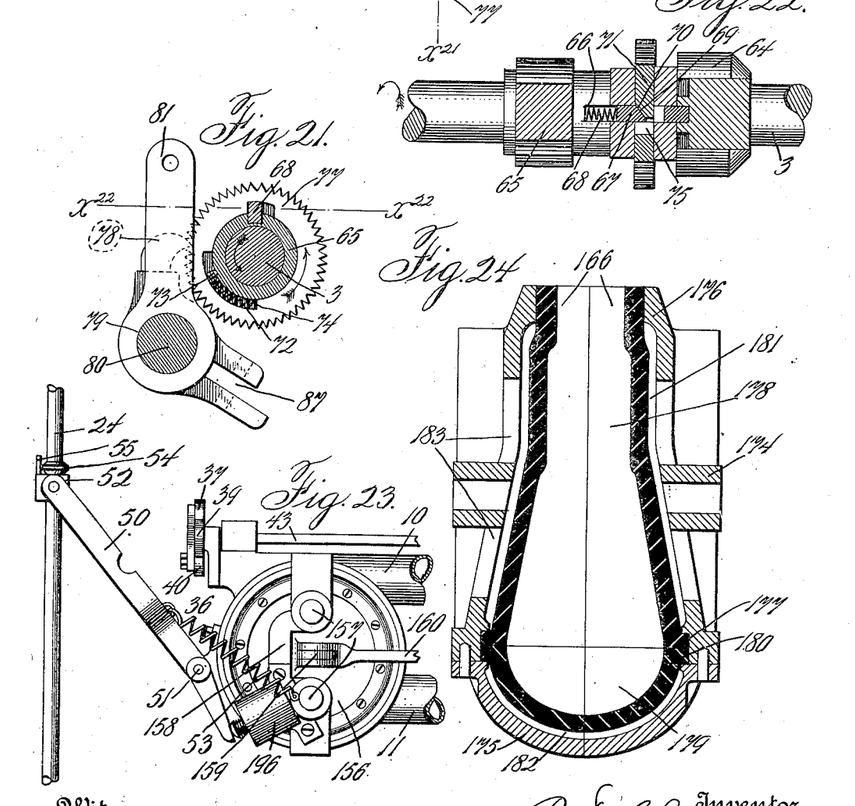
Fig. 21 is a vertical section on line $x^{21}$—$x^{21}$ of Fig. 20, showing also certain associated parts.
Fig. 22 is a section on line $x^{22}$—$x^{22}$ of Fig. 21.
Fig. 23 is a horizontal front elevation showing the take-off mechanism.
Fig. 24 is a vertical section through the mold.

As shown in Fig. 24 an improved mold comprises a two part shell, adapted to be supported in a suitable mold frame by which such parts may be moved and dipped. Each of the separable parts of the shell, as shown, comprises the body casting 174, and the half bottom casting 175. The body castings are provided with internally restricted top collars 176, and the body castings and the half bottoms together form grooves 177. It is obvious however that this particular construction of shell may be changed.

The carbon mold proper comprises the two parts which together constitute and form the mold cavity. Each part comprises the body part 178 and the half bottom part 179, the bottom and body parts 178 and 179 having flanges 180 thereon held within the grooves 177 of the mold shell, while the body parts 178 have their upper ends adapted to fit within the restricted collars 176 of the body parts 174 of the mold shell. While as described each mold half as made is in two parts it is obvious that each part be made in a single piece.

The mold parts 178 and 179 are formed of an agglutinated carbon either molded directly into the desired shape or worked out of a block of proper size and are in the form of a comparatively thin wall structure, which, however, is self supporting in that the carbon thereof maintains its shape without breaking. The shell which has been described merely serves for the manipulation of the carbon parts of the mold and to protect them against injury. The external diameter of the carbon part of the mold is less than the internal diameter of the supporting shell, except at the restricted collars and grooves, whereby an annular space 181 encircles the carbon between it and the shell. A corresponding space 182 is left between the carbon bottom 179 of the carbon mold and the bottom 175 of the shell. The shell has apertures 183 formed in its walls communicating with this annular space, whereby, when the complete mold is dipped into the water bath, not only will the water be in contact with the inner surface of the carbon mold but will also flow around the outer surface, whereby the mold will be effectually wetted and cooled on both sides. This is of importance in maintaining a uniform heat distribution in the mold and preventing the cracking of the latter due to heat strains.

With a mold so constructed the stopping of the molding operations to coat the mold is almost entirely avoided in that the body of the mold itself is of the material in which it is desired to mold. If, however, it is desired to coat the mold at any time lamp black or charcoal may be thrown into the interior of the mold to accomplish this purpose.

*Take off.*—As the blow-pipe frame swings back to normal horizontal position after the blowing of the bulb the projection 90 on the cam disk as before stated, will contact with the lever 48 of the chuck releasing system and actuate the latter to release the blow-pipe, which will slide in the guide formed by the rollers 37, 39 and 40, thus bringing the collar 54 on the blow-pipe against the yoke 52, whereupon the weight of the blow-pipe will swing the lever 50 around its pivot 51. In this motion the blow-pipe will be carried out of the guide formed by the rollers 37, 39 and 40, which have been opened and the blow-pipe will remain suspended in a vertical position from such yoke, the lever being arrested in the position shown in Fig. 23 by the contact of the tail thereof with a dash pot 196 carried on the bracket 158. In this position the blown bulb is pendant from the blow-pipe, thereby preventing distortion of the neck thereof by bending. When the blow-pipe is removed from the yoke, the spring 53 will return the lever 50 to its normal position as shown in Fig. 6.

Inasmuch as the claims of this application have been restricted to an air mechanism, I do not by failure to make claims not including recitals of the air mechanism abandon the same, as such claims are made in other applications, or will be made in other applications filed prior to the issuance of the patent hereon.

Having thus described my invention what I claim is:—

1. In a glass blowing machine, the combination with a glass carrying spindle, of a plurality of air pumps, successively delivering air charges to the glass carrying spindle, the said pumps being each constructed to deliver on each actuation thereof a definite predetermined charge at the rate required at that time to swell the glass on the glass carrying spindle.

2. In a glass blowing machine the combination with a glass carrying spindle, of a plurality of air pumps each adapted on each actuation thereof to deliver an air charge to the glass carrying spindle the air charges so delivered by the different pumps being of different characters.

BENJAMIN DAY CHAMBERLIN.

Witnesses:
FRED. C. CAMERON,
G. WILLIS DRAKE.